Patented Nov. 28, 1950

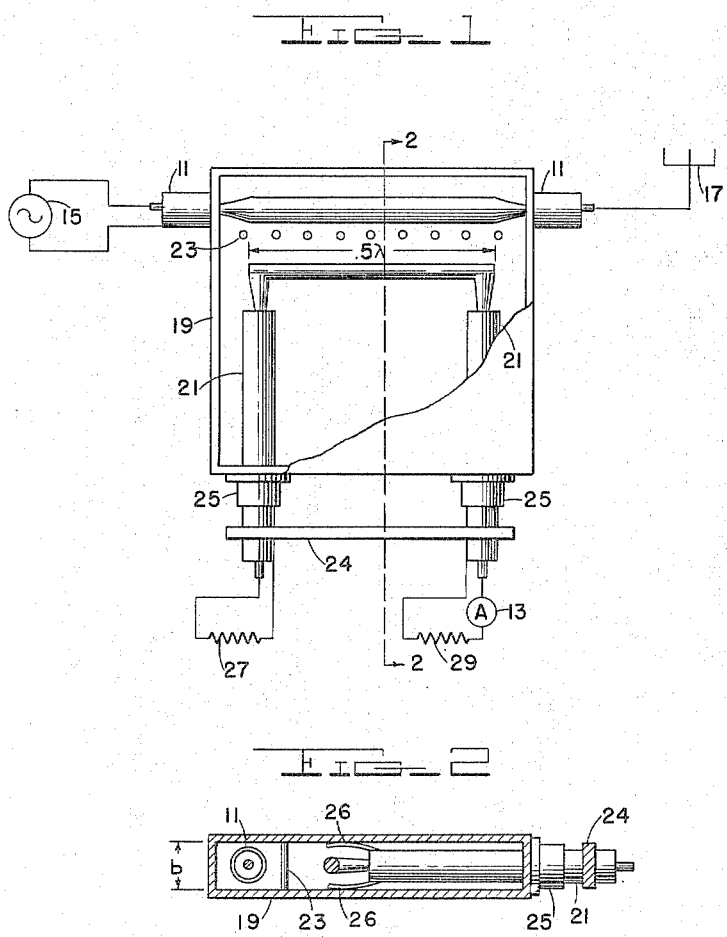

2,531,777

UNITED STATES PATENT OFFICE 2,531,777

VARIABLE DIRECTIVE COUPLER

John N. Marshall, Washington, D. C., assignor to Minister of Supply in His Majesty's Government of the United Kingdom of Great Britain and Northern Ireland, London, England Application October 24, 1945, Serial No. 624,297

4 Claims. (Cl. 178—44)

This invention relates to electric wave coupling means and more particularly to directive electric wave coupling devices.

An object of the invention is to provide means for coupling high frequency power from a transmission line to utilization means for indicating the amount of power passing through the line in a predetermined direction only.

Another object of the invention is to provide means for utilizing a portion of the high frequency power flowing in a desired direction only through a transmission line.

A further object of the invention is to provide a novel directive electric wave coupling device.

An understanding of the invention may be had by reference to the following description and to the accompanying drawing, in which:

Fig. 1 is a cut-away view of an exemplary embodiment of the invention, and

Fig. 2 is a cross-sectional view of the embodiment shown in Fig. 1, taken upon the plane indicated by the line 2—2.

Referring now to Fig. 1, the invention provides means for coupling a portion of the power flowing in one direction through a transmission line 11 to utilization means which may comprise a high frequency ammeter 13. In Fig. 1, the invention is arranged so that the ammeter 13 provides a relative indication of the amount of power flowing through line 11 from a high frequency generator 15 to a load, such as antenna 17. Power flowing from the antenna 17 toward the generator 15 produces a negligible current through the ammeter 13. Consequently, the electrical coupling provided by the invention between the line 11 and the utilization means comprising ammeter 13 may be said to be directive. In the arrangement shown in Fig. 1, the invention enables the ammeter 13 to provide an indication of the power output of the high frequency generator 15, while avoiding a false indication due to signal power intercepted by the antenna 17 and transmitted back along the line 11 toward the high frequency generator 15. The utility of the invention is not, however, limited to the application herein illustrated and described.

The structure of an exemplary form of the invention will now be described with reference to the drawing. The invention comprises a metallic box 19 enclosing a portion of each of two coaxial transmission lines 11 and 21. The outer conductors of the lines 11, 21 are conductively connected to the box 19 at the junctions therewith. Within the box 19, the inner conductors of lines 11, 21 are substantially parallel over a portion of the length of the inner conductor of the line 11. The outer conductors of the lines 11, 21 are discontinuous within the box 19, leaving the parallel portions of the inner conductors of lines 11, 21 exposed. An electrostatic shield comprising a plurality of conductive wires 23 is positioned perpendicular to the plane of the parallel portions of the inner conductors of lines 11, 21. The wires 23 are conductively connected at each end thereof to the interior surface of the box 21. The line 21 is bent within the box 19 so that the line 21 enters and leaves through the same side of the box 19. The exterior portions of the line 21 are joined mechanically by a rigid connection such as a bar 24. The line 21 passes through the sides of the box through bushings 25 which form a sliding fit with the outer conductor of line 21, thus enabling the distance between the parallel portions of lines 11, 21 to be adjusted by moving the bar 24 in the desired direction. Spring metal contact fingers 26 (Fig. 2) maintain a sliding conductive connection between the outer conductor of the line 21 and the interior surface of the box 19.

Consideration will now be given to the electrical properties of the invention. In order that no impedance discontinuity be introduced by the removal of the outer conductors of the lines 11, 21 within the box 19, it is necessary to maintain the characteristic impedance $Z_0$ of the lines 11, 21 constant throughout their length. Accordingly, the exposed portions of the inner conductors of the lines 11, 21 are expanded to a larger diameter, $d$, determined by the dimension $b$ of the box 19 as $$d = \frac{4b}{\pi} \epsilon^{-\frac{Z_0}{60}}$$

The length of the inner conductor of line 21 parallel to the inner conductor of line 11 is preferably made 0.5 wavelength, as determined by the frequency of the generator 15. The end of the line 21 toward the generator 15 is preferably terminated in an impedance 27 equal to the characteristic impedance of the line 21. The end of the line 21 toward the antenna 17 is terminated by the series combination of the ammeter 13 and an impedance 29 having a series impedance equal to the characteristic impedance of the line 21.

Power generated by the generator 15 is transmitted to the antenna 17 through transmission line 11. The resulting current and voltage in the line 11 set up magnetic and electric fields which travel along the line 11 from the generator 15 to the antenna 17. Within the box 19, the traveling magnetic field expands and induces two waves traveling in opposite directions along each elemental length of the inner conductor of the line 21. The wave traveling in the direction of the antenna 17 along the portion of the inner conductor of line 21 parallel to the inner conductor of line 11 builds up as the voltages induced in each elemental length of the inner conductor of the line 21 by the traveling magnetic field add in time phase along the inner conductor of line 21 and is absorbed by impedance 29, thereby causing an indication on ammeter 13. However, the traveling wave proceeding along the inner conductor of the line 21 in the direction of the generator 15 diminishes due to the successive phase shift of the voltages in each elemental length of the inner conductor of line 21. The total phase shift along the one-half wavelength section of the inner conductor of line 21 is 360 degrees. Consequently, no voltage is applied to the terminating impedance 27 because the traveling wave diminishes to zero amplitude in the direction of terminating impedance 27. For example, consider the situation where coupling occurs only at two imaginary points along line 11 which are separated by a quarter wave length. Two waves travelling in opposite directions will be induced at each of adjacent points in line 21. Said adjacent points are therefore also a quarter wave length apart. Assume a voltage wave travelling in line 11 from left to right. The voltage induced in line 21 at the left imaginary point and travelling to the right is in phase with the induced voltage at the right imaginary point travelling in that direction since the respective induced voltages travel the same distance to reach the right imaginary point. However, the induced voltage in line 21 from the left imaginary point travelling to the left is out of phase with the voltage induced at the right imaginary point and travelling in the same direction since the latter voltage must travel one half wave length further to reach the left imaginary point. Thus the induced voltages travelling to the left will cancel leaving only the induced voltage travelling to the right.

For two coupling points separated by a quarter wave length the frequency is critical since other frequencies will produce different phase relationships. The frequency band may be broadened by providing more coupling points. It is considerably broader in the specific embodiment shown in Fig. 1 wherein the number of coupling points is infinite.

The directive coupling provided by the invention will be apparent from a consideration of the condition when antenna 17 intercepts power from a wave signal in space. The signal power travels from the antenna 17 along the line 11 toward generator 15. Consequently, the preceding analysis of the operation of the invention is reversed. That is, the signal power from the antenna 17 induces travelling waves one of which diminishes to zero in the direction of the terminating impedance 29, thus producing no indication on ammeter 13. The wave traveling toward impedance 27 builds up and is absorbed by impedance 27.

It is apparent that the directivity of the coupling provided by the invention may be reversed simply by interchanging the generator 15 and the antenna 17.

By moving bar 27 toward or away from the box 21, the distance between lines 11 and 21 may be adjusted, thereby controlling the degree of coupling between the lines 11, 21. Thus, the invention provides an adjustable degree of directive coupling.

Since the ammeter 13 indicates power transmitted along the line 11 only in the direction of the load comprising antenna 17, the impedance of the antenna 17 should match the characteristic impedance of the line 11, in order to prevent reflection of power along the line in the opposite direction. However, the accuracy of the power indication is relatively independent of a slight impedance mismatch. For example, when the line 11 is terminated by a load producing 33 percent reflection, the error of the power indication provided by the invention is only 0.5 decibel. The error introduced in conventional current- or voltage-operated power indicators under the same conditions may be as high as ±3 decibels.

In a modified form of the invention, the electrostatic shield comprising conductors 23 is omitted and the interior of the box 19 is filled with non-conductive material having a dielectric constant considerably greater than unity. In this modified form the magnetic field is rendered ineffective by the dielectric material and the coupling between the lines 11, 21 is produced by means of the electric field, since the dielectric material has the effect of increasing the electric field intensity within the box 19.

It will be understood that the invention is not limited by the embodiment herein described and illustrated and that the scope of the invention is to be determined from the appended claims.

What is claimed is:

1. An electric wave directional coupler comprising two transmission lines, means for providing magnetic coupling between two substantially one-half wave length sections of the lines, electrostatic shielding means positioned between the lines, and separate impedance means attached to each end of at least one of said lines for terminating same in its characteristic impedance.

2. An electric wave directional coupler comprising two transmission lines, means for providing magnetic coupling between two substantially one-half wave length sections of the lines, electrostatic shielding means positioned between the lines, means for adjusting the degree of magnetic coupling, and separate impedance means attached to each end of at least one of said lines for terminating same in its characteristic impedance.

3. An electric wave directional coupler comprising two parallel one-half wave length conductive elements, a conductive surface enclosing the conductive elements, coaxial transmission lines terminating the respective conductive elements, the inner conductors of the lines being connected to the conductive elements and the outer conductors of the lines being connected to the conductive surface, separate impedance means connected to the remote ends of the transmission lines terminating one of said conductive elements, said impedance means providing a termination of each of said last named lines in its characteristic impedance, electrostatic shielding means positioned between the conductive elements, and means for adjusting the distance between the conductive elements.

4. In combination, a first coaxial transmission line, a second coaxial transmission line, a U-shaped section in said second line arranged with its base member parallel to said first transmission line, an electrostatic screen interposed between said first line and the U-shaped section of said second line and forming part of the outer conductor of each line for substantially a half wave length thereof, said U-shaped section being movable with respect to said first line, whereby power flowing in a predetermined direction in said first line will induce a voltage travelling in the predetermined direction in said second line.

JOHN N. MARSHALL.

REFERENCES CITED

The following references are of record in the file of this patent:

UNITED STATES PATENTS

| Number | Name | Date |
|---|---|---|
| 2,034,032 | Green et al. | Mar. 17, 1936 |
| 2,175,710 | Usselman et al. | Oct. 10, 1939 |
| 2,199,221 | Gilman | Apr. 30, 1940 |
| 2,244,756 | Alford | June 10, 1941 |

FOREIGN PATENTS

| Number | Country | Date |
|---|---|---|
| 545,936 | Great Britain | June 18, 1942 |

OTHER REFERENCES

An Instrument for Direct Measurement of the Traveling Wave Coefficient in Feeders, by G. W. O. Howe, published in "Wireless Engineer," vol. XX, No. 239, August 1943.